Figure 1:
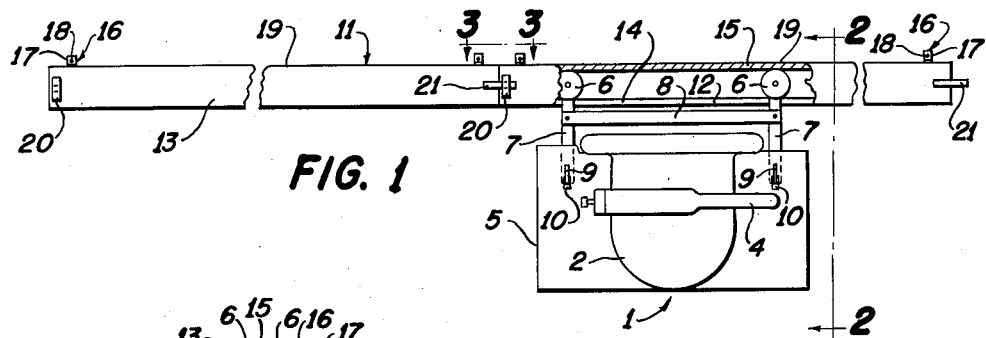

Dec. 5, 1961  E. LAMB  3,011,530
GUIDE FOR PORTABLE SAW
Filed July 13, 1959

INVENTOR.
ELLARD LAMB
BY Andrus + Starke
Attorneys

United States Patent Office 3,011,530
Patented Dec. 5, 1961

3,011,530
GUIDE FOR PORTABLE SAW
Eilard Lamb, 2312 N. 8th St., Milwaukee, Wis.
Filed July 13, 1959, Ser. No. 826,840
1 Claim. (Cl. 143—47)

The present invention relates to a guide for a portable saw and has particular reference to a light weight, inexpensive guide positionable on the surface of a work area formed by a plurality of boards secured to a supporting frame or the like such that access to the opposite surface of the work area for clamping purposes is prevented.

In the building industry, it is common practice to nail the sheathing and other boards or panels comprising the exterior building wall to the frame of the building prior to cutting the boards to proper lengths to speed the construction operation. The boards extend from the frame generally in random, irregular fashion and in a subsequent operation are cut to provide a straight finished edge. Normally, a portable saw is employed for this purpose with the saw being manually guided along a predetermined line of cut. The accuracy of the cut depends entirely upon the competence or skill of the carpenter and even with highly skilled carpenters, a true straight edge is very difficult to attain. This is particularly true where a relatively long cut is to be made necessitating periodic interruptions in the sawing operation to permit the operator to adjust his position.

To provide guide means for the saw, some carpenters resort to the expedient of securing a board to the work area parallel to the line of cut and which is designed to provide a flat raised surface engageable by a correspondingly flattened surface of the saw. By maintaining the saw in the same relative position on the guide board as the saw is moved along the line, some measure of accuracy may be gained in the cut. Here too the accuracy of the cut is dependent to a large extent upon the carpenter's skill or competence and where long cuts are required a straight edge is difficult to achieve. A further drawback of this expedient is due to the absence of the ready availability of the proper board or boards when it is desired to make the cut as it is impractical to carry the boards from job to job. At best, this is a rough improvisation.

Fabricated saw guides for portable saws have been proposed in the past but generally these devices have been limited in their application as they were secured in position by clamps engageable with opposite sides of the board or boards to be cut. Where the board underside is inaccessible for clamping purposes such as is the case in roughing in a frame, these prior art devices would be of no utility. These prior art structures were also relatively expensive and heavy in nature as they were primarily intended for permanent or semi-permanent location.

The present invention overcomes the shortcomings of the prior art devices by means of a saw guide formed of a light gauge, metal, channel member having inwardly formed flanges on each side wall. The flanges terminate in spaced end portions to define a slot extending the length of the channel. The guide of the invention is adapted for use with a standard portable type saw having associated therewith a pair of track engaging wheels rotatably supported in spaced relation to the saw and connected thereto by each of a pair of rod-like supports. The saw wheels are adapted to ride in the track in engagement with the bottom wall of the channel and the side wall flanges to maintain the saw at a fixed uniform distance from the track with the slot providing clearance for the rod-like supports.

According to the invention, the track is of sectional construction with the individual sections adapted to be held in alignment on a surface of the boards to be cut by a plurality of upstanding brackets secured to the track in spaced relation to each other along the track length. The free ends of the brackets are provided with openings adapted to receive nails driven into the boards along a line paralleling the line of cut and spaced in accordance with bracket-to-bracket distance. To facilitate track alignment, the track sections are provided with interfitting male and female members on opposite ends thereof and engageable with the corresponding female or male member on the adjacent track section end.

In operation, each track section is secured in place by locating the track brackets on suitable nails driven into the board surface and connected to adjacent sections by engagement of the male and female members to form a continuous aligned track. The saw wheels are moved into the open track end and the saw actuated and manually moved along the track to cut a true straight line.

The track of the invention is inexpensive of manufacture and is adapted for use with most standard portable saws. Its ease of installation and removal, together with the accuracy of the finished cut make the device of the invention a useful and desirable aid in a variety of construction applications.

The accompanying drawing illustrates the best mode presently contemplated of carrying out the invention.

Figure 2:
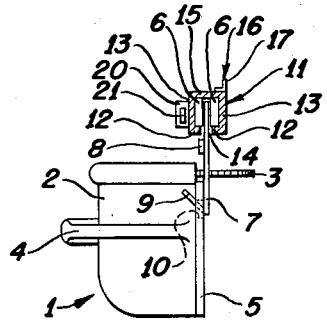
Figure 3:
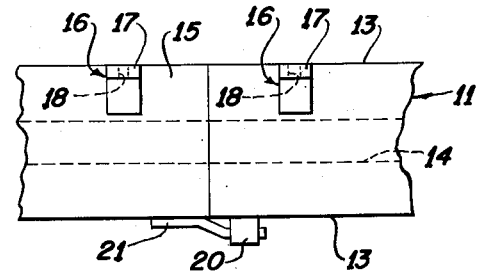
Figure 4:
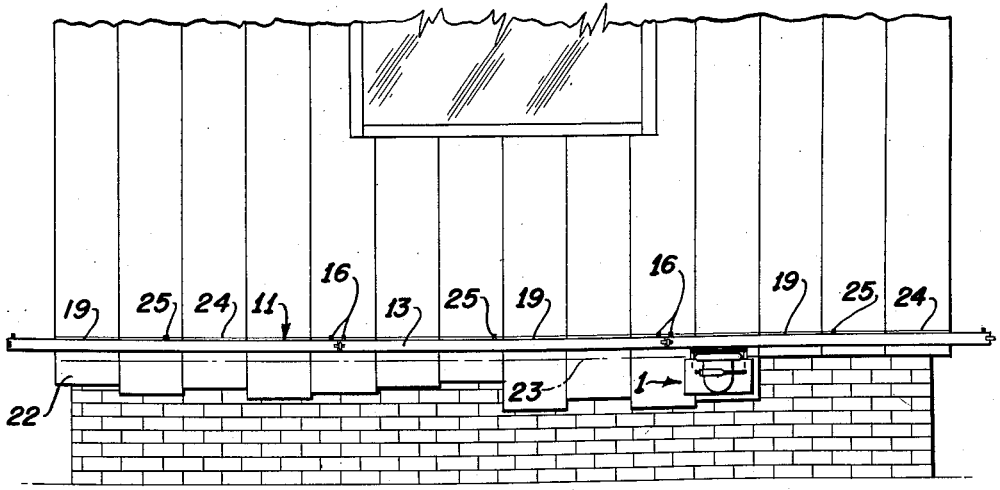

In the drawing:
FIG. 1 is a side elevation of the saw guide of the invention showing a portable saw in conjunction therewith and with parts of the saw guide broken away;
FIG. 2 is a view along lines 2—2 of FIG. 1;
FIG. 3 is a view along lines 3—3 of FIG. 1; and
FIG. 4 is a diagrammatic view of the invention as applied in a typical situation presented in the construction of a home or the like.

With reference to the drawing, the present invention is directed to a guide mechanism for a standard portable electric saw 1 having a motor enclosing casing 2 and a driven rotatable cutting blade 3. Casing 2 is formed with an integral upper handle or grip 4 and a lower rectangular saw table 5.

For the purpose of the present invention, saw 1 is provided with a pair of detachable wheels 6 rotatably supported in extended relation from saw 1 on one end of each of a pair of support rods 7. Rods 7 are rigidly connected together intermediate their ends and in spaced relation by a crossbrace 8. The ends of rods 7 opposite to the wheels 6 are formed with hook-shaped legs 9 adapted to be inserted through suitable openings 10 formed in saw table 5, one on either side of blade 3, to thereby loosely secure the wheels to the saw. As shown in FIGS. 1 and 2, wheels 6 are located equidistant from saw table 5 with rods 7 extending in a plane perpendicular to saw blade 3.

Saw wheels 6 are adapted to ride in a light gauge, channel-shaped metal track 11 having inwardly formed flanges 12 on each channel side wall 13 with the flanges terminating in spaced ends to define a longitudinally extending slot 14. Flanges 12 cooperate with the channel top wall 15 to engage diametrically opposed points on wheels 6 to maintain saw 1 at a uniform distance from track 11 with slot 14 providing clearance for wheel supporting rods 7 to permit saw movement along the track. Track 11 is open at the ends to permit initial positioning of wheels 6 therein.

Track 11 is adapted to be supported on the surface of a work area comprised of one or more boards or panels by a plurality of spaced angle-brackets 16 secured to track top wall 15. Brackets 16 project upwardly from track 11 and are disposed flush with side wall 13 to form therewith a flat work area engaging surface. The outer or free ends 17 of brackets 16 are provided with openings 18 adapted to receive suitable nails driven into the work area surface in predetermined locations to thus support the track in operative position.

For increased portability and economy of manufacture, track 11 is made in relatively short sections 19 with each section having two or more of the brackets 16 to stabilize the section on the working surface in general longitudinal alignment with adjacent track sections. To facilitate placement of the successive track sections along the working surface and to obtain more precise alignment, a sleeve-like member 20 is secured to one end of each track section 19 on the side wall 13 thereof opposite to that engageable with the work area surface with a metal strap 21 being secured to the opposite end of the track on the corresponding side wall 13. Strap 21 is formed with an intermediate curved portion with the free end of the strap extending longitudinally outwardly from the track end and laterally from the plane of the track as shown in FIG. 3. The free end of strap 21 is adapted to be inserted into sleeve member 20 of an adjacent track section end when the sections are properly aligned.

The invention finds particular application in the construction of homes or the like where, after the initial erection of a frame, a wall of layered construction is then formed by securing panels of suitable construction material or boards to the frame exterior. To simplify and speed the construction operation, the boards or panels comprising the wall layers are ordinarily dimensioned to exceed their finished length such that when nailed to the frame, they extend from at least one frame member to form a broken edge adjacent thereto. Such edges are normally provided along the roof lines, gables, and side walls in a typical home construction.

A typical example is shown in FIG. 4 illustrating a side wall of a home or other building having an irregular edge formed by the lower ends of the boards 22. In accordance with the invention and assuming the finished edge of the wall is to coincide with the line 23, a second line 24 is initially chalked or otherwise marked inwardly of line 23 relative to the opposite edge of boards 22 and spaced in parallel relation thereto a distance determined by the bracket openings 18 to saw blade 3 distance with the saw positioned within the track. This will be an easily determinable distance and constant for and given saw and track structure.

Nails 25 are then driven into the boards along line 24 and spaced from each other a distance equal to the center line distance between adjacent bracket openings 18, also a constant factor. The individual track sections 19 are then located on the surface of the boards by means of brackets 16 and connected to adjacent sections 19 to form a length of track commensurate with the length of the cut.

Wheels 6 are next attached to the saw by inserting hook-shaped legs 9 or rods 7 into saw table openings 10. Saw wheels 6 are engaged in the track through the open ends thereof whereupon the saw is actuated and moved along the track to effect the cut. It is preferred to maintain a slight outward lateral pressure on the saw relative to the track to retain the saw and wheels in fixed relative position and to maintain the brackets against the nails as any movement therebetween would to cause some inaccuracy in the line of cut.

The track of the invention is highly advantageous in that it is supported along the working area in a manner not requiring access to the underside of the boards which are to be cut.

After completion of the cut, track brackets 16 are lifted from the nails, the several track sections disengaged, and the track moved to another cut location or disassembled and stored for another job. The sectional track construction permits a large number of sections to be stored in a minimum of space rendering it highly desirable for job-to-job transport.

Wheels 6 may be detached from the saw at the completion of the cut if desired for ease of storage or transport to the next job. The detachable wheels 6 permit the saw to be utilized as a conventional portable saw.

Various modes of carrying out the invention are contemplated as being within the scope of the following claim particularly pointing out and distinctly claiming the subject matter which is regarded as the invention.

I claim:

In combination with a portable saw adapted to cut a straight line along a plurality of flat-wise disposed boards secured to a supporting frame with said saw having rotatable wheels connected to each outer end of a pair of laterally extending support rods carried by said saw, a channel-shaped track for said wheels having inwardly extending flanges formed on each of the channel side walls with the inner edge portions of said flanges being spaced from one another to provide a slot extending lengthwise of said track in which slot said rods are movable, a plurality of brackets secured to said track in spaced relation to other of said brackets and with said brackets being provided with openings disposed along a line parallel to the line of cut for receiving nails driven into the outer surface of said boards relative to the supporting frame to support said track on said surface parallel to the line of cut, and female and male members carried on opposite ends of said track for connection to corresponding female and male members of adjacent tracks for forming a continuous length of track.

References Cited in the file of this patent

UNITED STATES PATENTS

| | | |
|---|---|---|
| 587,492 | Prouty | Aug. 3, 1897 |
| 1,045,523 | Cossey | Nov. 26, 1912 |
| 1,425,125 | Viers | Aug. 8, 1922 |
| 1,563,844 | Gerlach | Dec. 1, 1925 |
| 1,699,582 | Breidenbach | Jan. 22, 1929 |
| 2,677,399 | Getsinger | May 4, 1954 |
| 2,696,851 | Davis | Dec. 14, 1954 |
| 2,708,465 | Huebner et al. | May 17, 1955 |

FOREIGN PATENTS

| | | |
|---|---|---|
| 934,789 | Germany | Nov. 3, 1955 |